Oct. 28, 1930.    O. B. GOLDMAN    1,780,141
STRESS INDICATOR AND RECORDER
Filed June 13, 1927
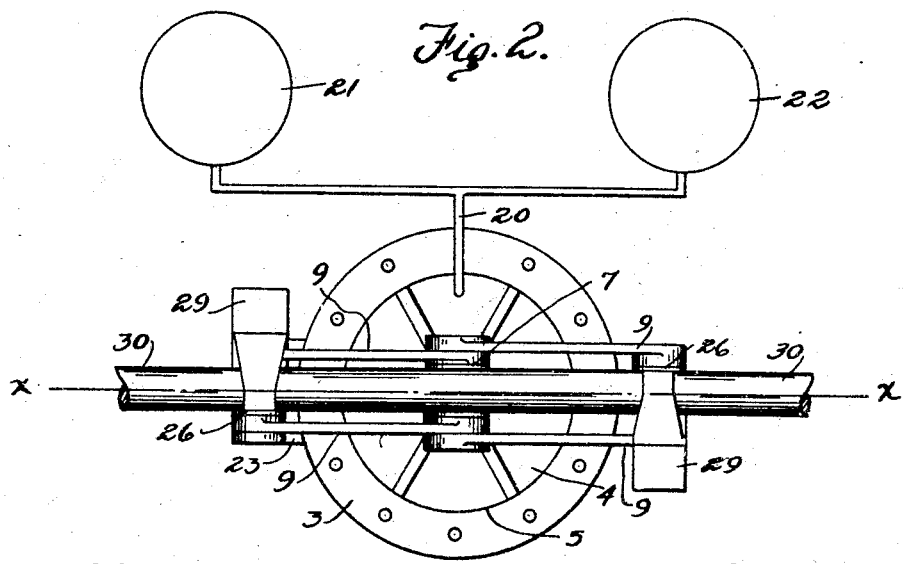
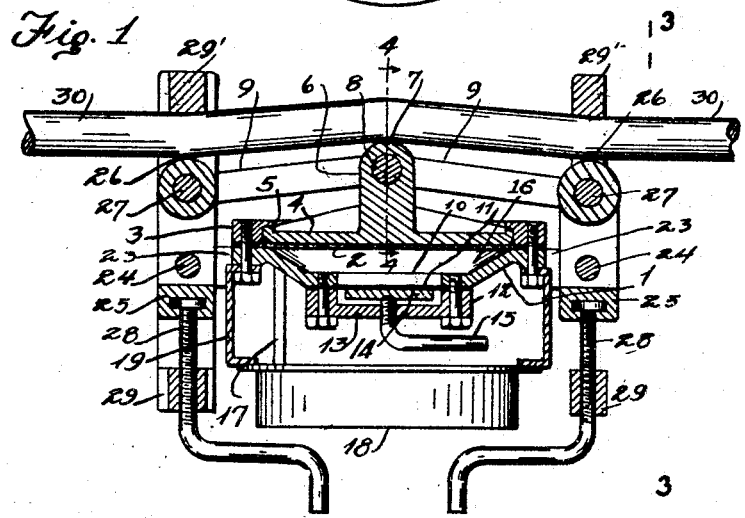
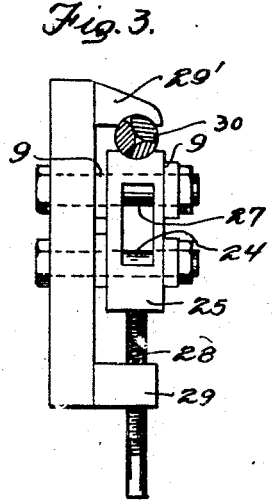
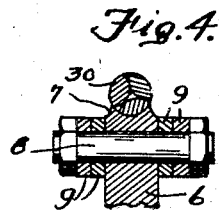
INVENTOR.
O. B. Goldman,
BY *Foster & Cadier*
ATTORNEYS.

Patented Oct. 28, 1930

1,780,141

UNITED STATES PATENT OFFICE

OTTO BERGER GOLDMAN, OF LONG BEACH, CALIFORNIA, ASSIGNOR, BY MESNE ASSIGNMENTS, TO MARTIN-DECKER CORPORATION, OF LONG BEACH, CALIFORNIA, A CORPORATION OF DELAWARE

STRESS INDICATOR AND RECORDER

Application filed June 13, 1927. Serial No. 198,654.

This invention relates to an improved means for measuring the stress in flexible members such as cables, belts, wires and cords, and more particularly, it relates to means, in a device of this kind, for allowing longitudinal movement between the device and the flexible member when the device is attached to said member, and further it relates to means for correcting or compensating for the change in volume of the enclosed liquid that occurs with changes in temperature.

In such devices, a length of flexible member is fastened in the device in such manner that a deflection of the flexible member is obtained. With a change in tension of the member, there results a change in its length, and if no provision is made to allow for this change in length of the deflected part, there will be sticking between the member and the device so that incorrect results will be obtained, and there will be wear of the device at the points of deflection so that the device will no longer give the same results as were obtained before these parts became worn and under which conditions the device was calibrated.

Further, with fixed points of deflection, the deflected part of the flexible member forms the two sides of an isosceles triangle whose base is the distance between the outer points of deflection and is of constant length. With change of stress the central point of deflection moves, changing the altitude of this triangle and necessarily changing the length of the sides, which, if not freely allowed, will also cause sticking and wear.

So also under changes of stress and the resulting changes of strain of the device, there is caused further motion between the member and the device with the results already noted and the sum of all of these motions noted will cause a relatively great amount of such movements and a corresponding large amount of sticking and wear.

Finally, further error in the results are obtained if no means are provided for compensating for the change in volume of the enclosed liquid which occurs with changes in temperature, this change in volume manifesting itself as a change in pressure.

The primary objects of my invention are to provide means in a device of the class described to allow free longitudinal motion of the flexible member when deflected by the device so as to prevent sticking and wear, and to provide means for correcting for the change of volume of the enclosed liquid that occurs with changes in temperature, all for the purpose of providing a device that will be accurate and lasting in use.

The objects set forth are accomplished by the structure illustrated in the accompanying drawing in which—

Figure 1 is a longitudinal section taken on the line x—x of Figure 2 and is shown with the indicating gage rigidly mounted on the device so as to make the instrument convenient for portable use; the device is shown with the flexible member clamped in position for measuring its stress.

Figure 2 is a back view of the device shown with the flexible member clamped in position for measuring its stress and is shown with the indicating and recording gages separately mounted as most convenient for stationary use.

Figure 3 is a section on the line 3—3 of Figure 1.

Figure 4 is a detail section on the line 4—4 of Figure 1.

In these drawings, the numeral 1 indicates a bowl having a flexible diaphragm 2 across its open face, the diaphragm 2 being clamped to the flange of the bowl 1 by means of the ring 3 in such manner as to be leak-proof. Resting against the outside of the diaphragm 2 and within the ring 3 and guided thereby, is the deflection plate 4 which is free to move inwardly against the diaphragm 2, its outward movement being restrained by the projecting shoulder 5 of the ring 3. This plate 4 has the centrally located offset rod 6 with its shoulder 7 forming the central deflection point, the offset 6 carrying the pin 8 to which is rotatably mounted one end of each of the links 9.

The bowl 1 has the opening 10 which is closed by the flexible diaphragm 11, the diaphragm 11 being clamped to the bowl 1 by means of the cover 12. This cover 12 has the recess 13 wherein is the plate 14 resting against the diaphragm 11 whose position is controlled by the screw 15, so that by the adjustment of the screw 15 and the deflection of the diaphragm 11, the volume of the space 16 may be altered.

In the portable type, the space 16 communicates by means of the tube 17 with the indicating gage 18 which is rigidly attached to the bowl 1 by means of the clips 19, the entire volume consisting of the space 16, the interior of the tube 17 and the tube of the indicating gage 18 being practically filled with a suitable liquid such as water or glycerine.

In the stationary type, the space 16 communicates by means of the tube 20 with the indicating gage 21 and the recording gage 22, the entire volume consisting of the space 16, the interior of the tube 20 and the tubes of the gages 21 and 22 being filled with a suitable liquid such as water or glycerine.

The bowl 1 is also provided with the lugs 23 carrying the pins 24 upon which are rotatably mounted the levers 25. These levers 25 have the shoulders 26 which form the outer deflection points and carry the pins 27 upon which the other ends of the links 9 are rotatably mounted. The location of the pins 27 and the pin 8 is such that the pins 27 are at the same distance from the surface of the diaphragm 2, while the pin 8 is at a greater distance from the said surface than the pins 27, so that the links 9 set angularly as shown. So also the shoulder 7 is at a greater distance from the surface of the diaphragm 2 than the shoulders 26, so that a flexible member 30 when resting against the shoulder 7 and forced to rest against the shoulders 26 will be deflected as illustrated.

The levers 25 have the screws 28 rotatably attached to them. The clamps 29 are slidably attached to the pins 24 and 27, and are also mounted on the screws 28, all so that the rotation of the screws 28 will cause the jaws 29' of the clamps 29 to move to or away from the shoulders 26 so that a flexible member 30 may be clamped against the shoulders 26 or released therefrom.

When a flexible member 30, resting against the shoulder 7, is clamped against the shoulders 26, a deflection of the member 30 is produced and this deflection produces, if the member 30 is under tension, a thrust against the shoulder 7, a thrust which is related quantitatively to the tension in the flexible member. This thrust is transmitted by means of the offset or rod 6, the plate 4, and the diaphragm 2, to the liquid enclosed in the space 16, producing a pressure in the mentioned liquid that is communicated to and indicated by the specified indicating pressure gage and is communicated to and recorded by the specified recording pressure gage. The relation between the indicated or recorded pressure and the tension in the member 30 is given by the calibration curve of the device obtained by calibration in the usual manner.

A change in tension of the flexible member causes a motion in the offset or rod 6 which movement, due to the links 9 causes a movement of the shoulders 26 corresponding to and preferably equal to the relative movement between the flexible member and the device when the shoulders are fixed, so that there will be little or no movement between them at the clamping surfaces.

Having thus described my invention, what I claim is—

1. In a tension measuring device, a fluid pressure cell including a rigid hollow body open at one side, a yieldable closure for the open side of the cell, a presser plate resting on the outside of the closure, a pair of rope engaging members carried by the rigid cell body at spaced points and arranged to engage a rope at one side thereof, a third rope engaging and deflecting member carried by the presser plate and engaging the opposite side of the rope between the first rope engaging members, a flexible diaphragm extending across the cell in spaced relation to the closure and to the side opposite the closure, and means for flexing the diaphragm and thereby controlling the capacity of the cell between said closure and diaphragm and deflecting the closure to a predetermined position.

2. In a tension measuring device, a fluid pressure cell including a rigid hollow body open at one side, a yieldable closure for the open side of the cell, a presser plate resting on the outside of the closure, a pair of rope engaging members carried by the rigid cell body at spaced points and arranged to engage a rope at one side thereof, a third rope engaging and deflecting member carried by the presser plate and engaging the opposite side of the rope between the first rope engaging members, a flexible diaphragm extending across the cell in spaced relation to the closure and to the side opposite the closure, a presser plate between the side of the cell opposite the closure and the diaphragm and bearing on the latter, and a screw threaded through the closure and engaging the last presser plate to flex the diaphragm.

3. In a tension measuring device, a fluid pressure cell including a rigid hollow body open at one side, a yieldable closure for the open side of the cell, a presser plate resting on the outside of the closure, a pair of rope engaging members carried by the rigid cell body at spaced points and arranged to engage a rope at one side thereof, a third rope engaging and deflecting member carried by the presser plate and engaging the opposite side of the rope between the first rope engaging members, a flexible diaphragm extending across the cell in spaced relation to the closure, means for flexing the diaphragm and thereby controlling the capacity of the cell between said closure and diaphragm and deflecting the closure to a predetermined position, and stop means for positioning the rope in fixed spaced relation to the body of the cell.

4. In a tension measuring device, a fluid pressure cell including a rigid hollow body open at one side, a yieldable closure for the open side of the cell, a presser plate resting on the outside of the closure, a pair of rope engaging members carried by the rigid cell body at spaced points and arranged to engage a rope at one side thereof, a third rope engaging and deflecting member carried by the presser plate and engaging the opposite side of the rope between the first rope engaging members, a flexible diaphragm extending across the cell in spaced relation to the closure and to the side opposite the closure, a presser plate between the side of the cell opposite the closure and the diaphragm and bearing on the latter, a screw threaded through the closure and engaging the last presser plate to flex the diaphragm, and stop means for positioning the rope in fixed spaced relation to the body of the cell.

5. In a tension measuring device, a fluid pressure cell having a rigid body open at one side, a presser plate at the open side of the cell, a flexible element holding fluid in said cell and engaging the presser plate on the side next the cell, means associated with the presser plate and forming a seat for one side of a flexible tension element, a pair of abutment members pivoted to the body and forming seats at their free ends for the same side of the flexible tension element, said members having the first seat in alinement between the said members and projecting further from the plane of the presser plate than the seats of said members, means to force the tension element into seated relation with said abutment members and thereby normally to produce a predetermined deflection in said tension element, and a pressure gage connected to said cell to receive the pressure of the fluid therein.

6. In a tension measuring device; a fluid pressure cell having a rigid body open at one side, a presser plate at the open side of the cell, a flexible element holding fluid in said cell and engaging the presser plate on the side next the cell, means associated with the presser plate and forming a seat for one side of a flexible tension element, a pair of abutment members pivoted to the body and forming seats at their free ends for the same side of the flexible tension element, said members having the first seat in alinement between the said members and projecting further from the plane of the presser plate than the seats of said members, means to force the tension element into seated relation with said abutment members and thereby normally to produce a predetermined deflection in said tension element, inclined links connecting the middle seat with the pair of abutment members in spaced relation to their pivots, and a pressure gage connected to said cell to reveal the pressure of the fluid therein.

7. A stress measuring device comprising a chamber, a fluid enclosed in said chamber, means for measuring the pressure of said fluid, means movable in said chamber to vary the effective volume thereof, a rod operatively connected to said volume-varying means and extending out of said chamber to engage one side of a member under tension, means on each side of said rod for engaging the opposite side of said stressed member, means for adjusting one of said second mentioned engaging means to produce a deflection in said stressed member, and links connecting said rod to said engaging means to maintain constant the distance therebetween.

8. In a stress measuring device, an inner deflecting point, a pair of outer deflecting points spaced upon opposite sides of said inner deflecting point, means for maintaining constant the distances between the inner and outer points, said inner deflecting point being movable under stress transversely of a line passing through the outer deflecting points, and means associated with the inner deflecting point for measuring the stress exerted thereon.

9. In a stress measuring device, a fluid containing chamber, means to vary the capacity of the chamber, said means having a rod movable toward and from said chamber, means at each side of said chamber fixed with relation thereto and arranged upon each side of said rod, said last means being engageable upon one side of a stressed member, said rod being engaged by the opposite side of said stressed member to be moved thereby in proportion to the stress thereupon, means for maintaining constant the distance between each of said outer engaging members and the engaging portion of said rod, and means associated with the chamber for measuring stress exerted in said chamber by movement of said rod.

10. In a stress measuring device, a fluid containing chamber, means to vary the capacity of the chamber, said means having a rod movable toward and from said chamber, means at each side of said chamber fixed with relation thereto and arranged upon each side of said rod, said last means being engageable upon one side of a stressed member, said rod being engaged by the opposite side of said stressed member to be moved thereby in proportion to the stress thereupon, means for maintaining constant the distance between each of said outer engaging members and the engaging portion of said rod, means associated with the chamber for measuring stress exerted in said chamber by movement of said rod, and means for moving one of said outer engaging members optionally to deflecting position or to releasing position.

OTTO BERGER GOLDMAN.